2,820,031
PHENOTHIAZINYL-ALKANOIC ACID-ALKYL AMIDES

Raymond Jacques Horclois, Malakoff, Jean Metivier, Arpajon, and Edouard Suau, Choisy-le-Roi, France, assignors to Societe des Usines Chimiques Rhone-Poulenc, Paris, France, a French body corporate No Drawing. Application July 8, 1953
Serial No. 366,876
Claims priority, application France August 4, 1952

6 Claims. (Cl. 260—243)

This invention relates to phenthiazine derivatives and particularly to 10-carbonamidoalkyl phenthiazines.

According to the present invention there are provided new derivatives of phenthiazine of the general Formula I:

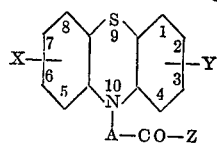

where A represents an alkylene group containing less than 3 carbon atoms, Z represents a substituted amino group and X and Y are the same or are different and consist of hydrogen atoms, halogen atoms, or alkyl or alkoxy groups in which the alkyl or alkoxy group contains up to 4 carbon atoms.

More particularly the group Z may be a secondary or tertiary amino group derived from an aliphatic, cycloaliphatic, aromatic or heterocyclic amine. Examples of substituents in the amino group Z are methyl, ethyl, propyl, butyl and higher alkyl groups, cyclohexyl and phenyl. Where the group Z is derived from a heterocyclic amine, it may for example consist of a piperidyl or pyrrolidyl radical. Where X or Y is other than hydrogen it is preferably a chlorine atom, methyl or methoxy group.

The aforesaid compounds are of important commercial value as intermediates in the production of phenthiazine derivatives which have a therapeutic value. More especially, they are readily convertible by reduction into therapeutically useful compounds of the type:

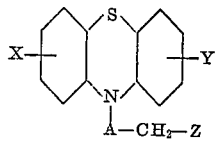

where X, Y, A and Z have the values hereinbefore assigned to them.

According to a feature of the present invention, compounds of the aforesaid general Formula I are produced by reacting a phenthiazine compound of the general Formula III:

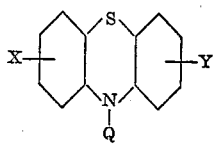

where Q is a hydrogen atom or a lower alkyl ester, acid chloride or anhydride grouping corresponding to the acid grouping —A—COOH, with an appropriate reactant to introduce in the 10-position of the phenthiazine nucleus an —A—CO—Z grouping. Particular methods according to the present invention are as follows:

(a) By condensing a phenthiazine of general Formula III where Q is a hydrogen atom with a compound of the general formula

P—A—CO—Z where P is a halogen atom. The reaction is preferably carried out in the presence of an acid-binding agent in the form, preferably, of a member of the class consisting of alkali metals and their derivatives, e. g. hydroxides, hydrides, amides, alcoholates and metal-alkyl or metal-aryl compounds. The preferred acid-binding agents are sodamide, metallic sodium, powdered sodium and potassium hydroxides, lithium hydride, sodium tertiary butylate, butyl lithium and phenyl lithium.

(b) By condensing a phenthiazine compound of general Formula III where Q is an —A—COOR group, R being a lower alkyl group containing up to 4 carbon atoms, with a primary or secondary amine HZ. This condensation is preferably effected in an inert solvent medium. It may be carried out at ordinary temperatures but it is preferably carried out with heating, e. g. up to 150° C., optionally in an autoclave under pressure.

(c) By condensing a phenthiazine compound of general Formula III where Q is an —A—COCl or the corresponding anhydride group with a primary or secondary amine HZ. This condensation is preferably effected in an inert solvent medium at room temperature or below, e. g. below 10° C.

The following examples will serve to illustrate the invention. The melting points were determined on a Kofler block.

Example I 3 g. of phenthiazine-10-acetic ethyl ester are heated at 100° C. for 16 hours with 20 cc. of an alcoholic solution of monomethylamine (18%). After cooling, the production formed is filtered off, washed with alcohol and dried. 2.4 g. of phenthiazine-10-acetic acid methylamide are obtained, which melts at 228° C. after recrystallisation from absolute alcohol.

The phenthiazine-10-acetic ethyl ester employed as starting material is prepared from phenthiazine and ethyl bromoacetate by the method of Cauquil and Cassadevall, Comptes Rendus, 225, 578 (1947).

Example II 10 g. of phenthiazine and 2.1 g. of sodamide are boiled together in 40 cc. of xylene and a solution of 5.4 g. of N-monomethylchloracetamide in 30 cc. of xylene is added over a period of 15 minutes. The mixture is heated under reflux for 6 hours. On cooling, some of the phenthiazine is recovered and isolated by filtration. By distilling the xylene from the filtrate and recrystallisation of the residue from absolute alcohol, phenthiazine-10-acetic acid methylamide is obtained as in Example I.

Example III 2 g. of the methyl ester of 3 - (phenthiazinyl - 10' - ) propionic acid and 15 cc. of an 18% alcoholic solution of monomethylamine are heated in a sealed tube at 100° C. for 17 hours.

1.7 g. of 3-(phenthiazinyl-10'-) propionic acid methylamide are obtained which, after recrystallisation from methyl alcohol melts at 96° C.

Similarly, by heating 1 g. of the same ester with 1.5 g. of piperidine and 5 cc. of toluene in a sealed tube at 150° C. for 16 hours, 0.8. g. of 3-(phenthiazinyl-10'-) propionyl-N-piperidine is obtained which, after recrystallisation from 3 cc. of methyl alcohol melts at 128–129° C.

By heating 2 g. of the said ester with 14 cc. of an alcoholic solution solution (29%) of monoethylamine in a sealed tube at 100° C. for 20 hours, 2.1 g of 3-(phenthiazinyl-10'-) propionic acid ethylamide are obtained, which substance, after recrystallisation from 50% ethyl alcohol melts at 120° C.

The methyl ester of 3-(phenthiazinyl-10'-) propionic acid is prepared in the following manner: 20 g. of 3-(phenthiazinyl-10'-) propionic acid prepared by the method of Smith, J. Org. Chem. 15, 1125 (1950), are added to 100 cc. of methanol, containing 36.5 g. of hydrochloric acid. The mixture is heated at 50° C. for one hour, and then distilled in vacuo. The residue is treated with 40 cc. of a 30% aqueous solution of sodium carbonate and the product is extracted with 100 cc. of ethyl acetate. 18 g. of the methyl ester of 3-(phenthiazinyl-10'-) propionic acid are obtained which, after recrystallisation from methanol, melts at 68° C.

*Example IV*

0.64 g. of the methyl ester of 3-(3'-chlorophenthiazinyl-10'-) propionic acid is dissolved by heating in 2 cc. of methyl alcohol. The product is cooled to 20° C. and 2 cc. of an 18% solution of monomethylamine in ethyl alcohol are added. The mixture is allowed to react for 4 hours, whereafter the solvents are driven off in vacuo and the product is crystallised from 4 cc. of methyl alcohol. In this way, 3-(3'-chlorophenthiazinyl-10'-) propionic acid methylamide is obtained, which melts at 85° C.

In order to obtain the methyl ester of 3-(3'-chlorophenthiazinyl-10'-) propionic acid, the nitrile (M. P. 178°–179° C.) is first prepared from 3-chlorophenthiazine and acrylonitrile by analogy with the method described by Smith, J. Org. Chem. 15, 1129 (1950). This nitrile is hydrolysed by treatment with alcoholic caustic soda solution and 3-(3'-chlorophenthiazinyl-10'-) propionic acid (M. P. 156° C.) is obtained. By treating this as in Example III, the methyl ester is prepared which, after recrystallisation from methanol, melts at 74° C.

*Example V*

3.85 g. of phosphorus pentachloride dissolved in 38 cc. of phosphorus oxychloride are run, at a temperature below 10° C., into a suspension of 5 g. of 3-(phenthiazinyl-10'-) propionic acid (prepared by the method of Smith, J. Org. Chem. 15, 1125–1130 (1950)) in 20 cc. of phosphorus oxychloride. The mixture is heated for half-an-hour at 50° C. and the phosphorus oxychloride is then driven off in vacuo in the cold. The crude acid chloride thus obtained is dissolved in 75 cc. of benzene and this solution is gradually run, with stirring, into a solution of 3.4 g. of piperidine in 25 cc. of anhydrous benzene, the temperature being kept below 10° C. The benzene solution is successively washed with 50 cc. of water, 40 cc. of normal hydrochloric acid, 40 cc. of saturated sodium bicarbonate solution and 25 cc. of water. It is then dried over sodium sulphate, and the benzene is then driven off in vacuo. 6 g. of 3-(phenthiazinyl-10'-)propionyl-N-piperidine are obtained, this substance crystallising after seeding. After recrystallisation from ethyl acetate, it melts at 128°–129° C.

*Example VI*

9.9 g. of phenthiazine and 3.0 g. of sodamide are added with stirring to 100 cc. of cold dry dimethylaniline. On heating to the boiling point ammonia is evolved vigorously and a bulky orange precipitate begins to separate. After 20 minutes reaction under reflux, evolution of ammonia has virtually ceased. The stirred reaction mixture is then cooled to 100° C. and treated with 10.5 g. of N-dimethyl-α-bromopropionamide during 10 minutes, when the suspended orange solid is rapidly replaced by a smaller bulk of finely divided brown material. Reaction is completed by heating for a further 10 minutes at 180° C. The dimethylaniline is removed by steam distillation. The residue is acidified with 30 cc. of 2 N sulphuric acid and extracted with ether. The ethereal extract is washed with 20 cc. of 2 N sodium hydroxide and then twice with 20 cc. of water. The ether layer is dried over potassium carbonate, the solvent removed and the residue sublimed at 145–160° C./0.1 mm. The sublimate forms short yellowish needles which are collected and crystallised from benzene/light petroleum (B. P. 40–60° C.). Recrystallisation from ether gives 2-(phenthiazinyl-10'-) propionic acid dimethylamide in the form of colourless prismatic needles, M. P. 165–167° C.

*Example VII*

A solution of 5.43 g. of 3-(phenthiazinyl-10'-) propionic acid in 300 cc. of dry ether is treated with 1.6 cc. of pyridine and then cooled to —10° C. 0.72 cc. of thionyl chloride in 20 cc. of dry ether is added dropwise with vigorous agitation during 5 minutes, the temperature being maintained at —10° C. A white precipitate separates immediately and the ether layer which contains the 3-(phenthiazinyl-10'-) propionic anhydride formed is decanted from this precipitate, cooled to —30° C. and treated at this temperature with 11.0 cc. of a solution of dimethylamine in ether (84.4 g. per litre) added dropwise, the reaction mixture being vigorously shaken throughout the addition. The ether layer is again decanted from a white precipitate, and washed first with 20 cc. of N sodium hydroxide and then with successive quantities of 10 cc. of water until the washings react neutral to Universal test paper. The ether layer is dried over magnesium sulphate and evaporated to dryness. The residue amounts to 2.45 g. and is crystallised from methanol, yielding 3-(phenthiazinyl-10'-) propionic acid dimethylamide as colourless prisms, M. P. 141–143° C.

Although in this example, only half of the anhydride formed as intermediate product is converted by reaction with dimethylamine to the amide, the reaction has the advantage that it may be carried out under very mild conditions, the low temperature used in the example not being essential.

We claim:
1. 3-(phenthiazinyl-10')-propionic acid methylamide.
2. 3-(phenthiazinyl-10')-propionyl-N-piperidine.
3. 3 - (3' - chloro - phenthiazinyl - 10') - propionic acid methylamide.
4. 2-(phenthiazinyl-10')-propionic acid dimethylamide.
5. 3-(phenthiazinyl-10')-propionic acid dimethylamide.
6. A phenthiazine derivative of the general formula

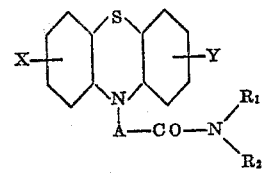

where A is an alkylene group containing less than three carbon atoms, $R_1$ and $R_2$ when taken singly are each selected from the class consisting of hydrogen atoms and alkyl groups containing up to four carbon atoms at least one of them being an alkyl group containing up to four carbon atoms, and, taken together, represent a group selected from the class consisting of the piperidine group and the pyrrolidine group, and X and Y are selected from the class consisting of hydrogen atoms, halogen atoms, alkyl groups containing up to four carbon atoms and alkoxy groups containing up to four carbon atoms.

References Cited in the file of this patent

UNITED STATES PATENTS

| | | |
|---|---|---|
| 2,485,212 | Miescher et al. | Oct. 18, 1949 |
| 2,576,106 | Cusic | Nov. 27, 1951 |
| 2,591,679 | Cusic | Apr. 8, 1952 |
| 2,615,886 | Dahlbom et al. | Oct. 28, 1952 |
| 2,627,517 | Cusic | Feb. 3, 1953 |

FOREIGN PATENTS

| | | |
|---|---|---|
| 519,296 | Belgium | May 15, 1953 |
| 519,787 | Belgium | May 30, 1953 |
| 1,060,189 | France | Nov. 18, 1953 |
| 1,065,615 | France | Jan. 13, 1954 |